United States Patent [19]

Jensen

[11] 4,330,311

[45] May 18, 1982

[54] HIGH PRESSURE FORMING BUSHING AND FIN COOLER

[75] Inventor: Thomas H. Jensen, Murrysville, Pa.

[73] Assignee: PPG Industries, Inc., Pittsburgh, Pa.

[21] Appl. No.: 193,197

[22] Filed: Oct. 2, 1980

[51] Int. Cl.³ .......................................... C03B 37/025
[52] U.S. Cl. .............................................. 65/1; 65/12
[58] Field of Search .................................. 65/1, 2, 12

[56] References Cited

U.S. PATENT DOCUMENTS

| | | | |
|---|---|---|---|
| 2,947,028 | 8/1960 | Slayter | 65/12 |
| 3,328,144 | 6/1967 | Glaser | 65/2 X |
| 3,573,014 | 4/1971 | Strickland et al. | 65/1 |
| 3,574,581 | 4/1971 | Strickland et al. | 65/1 |
| 3,625,025 | 12/1971 | Jensen | 65/2 |
| 3,733,188 | 5/1973 | Jensen | 65/2 |
| 3,829,301 | 8/1974 | Russell | 65/12 X |
| 3,920,430 | 11/1975 | Carey | 65/1 |
| 3,972,702 | 8/1976 | McCormick et al. | 65/1 |

Primary Examiner—Robert L. Lindsay, Jr.
Attorney, Agent, or Firm—John E. Curley

[57] ABSTRACT

A high pressure glass fiber forming bushing and cooperating fin cooler assembly are disclosed. The bushing is provided with a corrugated tip plate which carries the nozzles or tips through which the glass fiber is forced by a pump or other pressure creating means. Additionally, the tip plate is provided with recesses which extend across the tip plate transversely to the corrugations. A cooperating fin cooler is secured beneath the tip plate to cool the filaments and to provide support for the tip plate. The fins of the fin cooler are arranged parallel to the corrugations in the tip plate. A plurality of ceramic rods are carried by the fin cooler and extend transversely to the fins and coincident with the recesses in the tip plate. These ceramic rods are received in the recesses to provide support for the tip plate.

17 Claims, 4 Drawing Figures

HIGH PRESSURE FORMING BUSHING AND FIN COOLER

FIELD OF THE INVENTION

The present invention is directed to a high pressure glass fiber forming bushing and fin cooler assembly. More particularly, the present invention is directed to such a bushing and fin cooler assembly in which the fin cooler provides support for the bushing. Most specifically, the present invention is directed to a bushing and fin cooler in which insulating rods separate the bushing and fin cooler. The high pressure forming bushing includes a generally corrugated tip plate having crests and valleys. The tops of the crests are flattened and carry the nozzles or tips through which the glass flows. Support of the tip plate is provided by a fin cooler secured beneath the bushing. The fins of the cooler run parallel to the valleys and crests of the tip plate but are not in contact with the tip plate. A plurality of ceramic rods or rods of similar insulation material extend transversely to the fins and are received in recesses formed in the tip plate, the recesses similarly being transverse to the corrugation of the tip plate. The rods are seated in castable refractory material in the recesses so that the fin cooler will provide support for the tip plate while being electrically and thermally insulated therefrom.

DESCRIPTION OF THE PRIOR ART

In the formation of glass fibers, various bushings have been described in the prior art for use in forming glass fibers under high pressures. Typical of such patents are U.S. Pat. Nos. 3,573,014; 3,574,581 and 3,625,025. In the processes described in the aforementioned patents, special bushing configurations generally of a tubular shape are utilized in conjunction with high pressure forming equipment such as special pumps as described in my U.S. Pat. No. 3,733,188 which permit the formation of glass fibers under high pressure conditions. These processes are valuable in that fine filament fibers can be produced at considerably reduced tensions. The utilization of glass fiber bushings having a folded configuration is also shown generally in the aforementioned U.S. Pat. No. 3,574,581.

At the operating temperature range of a bushing assembly in a glass fiber forming process, this temperature being in the range of 2200° F., the tip plate of the bushing is quite plastic and is easily deformed by creep or sag of the platinum or platinum-rhodium alloy which are typically used as bushing metal. The bushing assembly will eventually deform in a non-pressure forming process and when the pressure is increased to the range of 5-25 psig, the rate of deformation of the tip plate of the bushing is correspondingly increased.

Various measures have been adopted to provide increased strength for the tip plate of the bushing to counteract the deformation which causes filament size discrepancies and eventually forces the shutting down of a position and the removal of the bushing. In my co-pending patent application, Ser. No. 193,206, filed Oct. 2, 1980 there is disclosed a corrugated tip plate of a bushing and a fin cooler in which the fins contact the tip plate at insulated areas on the plate to provide support. This type of arrangement will support the bushing tip plate but the heat pattern of the tip plate may be affected. There is also a possibility of electric shorting between the electrically heated tip plate and the fin cooler should the ceramic insulation area become embrittled and fall away.

An alternative solution to the problem has been provided in my co-pending patent application Ser. No. 193,195, filed Oct. 2, 1980, in which there is disclosed a fin cooler for use with a high pressure forming bushing in which the fins of the cooler carries one or more vertical projections which contact a castable refractory carried in the valleys of the corrugated tip plate. This fin cooler is also susceptible to causing variations in the heat pattern of the tip plate. The castable refractory, should it erode and fall, may cause shorting between the tip plate and the protrusions on the fin cooler embedded in the castable.

While high pressure glass fiber forming provides finer filaments at lower winding tensions, it has not been entirely successful because of problems with tip plate deformation, the resulting short bushing life, and the problems of tip plate temperature variations caused by contact with the fin cooler.

SUMMARY OF THE INVENTION

It is an object of the present invention to provide a high pressure glass forming bushing and fin cooler.

Another object of the present invention is to provide a corrugated bushing tip plate.

A further object of the present invention is to provide a bushing and cooperating fin cooler.

Still another object of the present invention is to provide a fin cooler which supports a bushing tip plate while being electrically insulated therefrom.

Yet another object of the present invention is to provide a fin cooler and bushing wherein the fin cooler supports the tip plate without adversely affecting the heat pattern of the tip plate.

As will be set forth in greater detail in the description of a preferred embodiment, the high pressure forming bushing and fin cooler assembly in accordance with the present invention is comprised generally of a bushing having a corrugated tip plate and a cooperating supporting fin cooler. The tip plate has crests and valleys with the crests being flattened to carry the nozzles or tips through which the molten glass flows to form filaments. Spaced recesses are formed transversely to the crests and valleys. A fin cooler is secured below the tip plate with its fins extending parallel to the corrugations in the tip plate. A plurality of ceramic rods or rods of similar electrically insulating material are carried by the fins transversely to the direction of the fins. These rods are received in a castable refractory material set in the recesses of the tip plate. The fin cooler thereby supports the tip plate and prevents sag and deformation of the tip plate.

In contrast to prior tip plates, the assembly in accordance with the present invention is less subject to sag or deformation. The structure provided by the corrugations and the intersecting recesses is somewhat analogous to an egg carton and provides increased strength. Furthermore, the cross structure of the fins of the fin cooler and the transverse ceramic rods also create a stronger element.

The fin cooler supports the tip plate through contact of the ceramic rods with the castable refractory carried in the recesses of the tip plate. There is no likelihood of metal to metal contact so that electric shorting between the tip plate and fin cooler is essentially eliminated. Furthermore, the glass from the nozzles or tips is not apt to migrate into the refractory in the recesses so that the refractory is less apt to become brittle and fall out.

Since the tip plate is well supported, and will not sag or deform as it would if unsupported, the glass can be supplied at a relatively high pressure to produce very fine filaments of a more uniform diameter and with less winder tension than has been possible with prior art devices.

The ceramic rods or tubes may also be used to carry coolant thereby reducing the temperature of the glass fibers formed by the bushing.

The bushing and fin cooler assembly in accordance with the present invention is effective in providing adequate support for the tip plate and cooling of the filaments while avoiding the various drawbacks encountered in prior art devices.

BRIEF DESCRIPTION OF THE DRAWINGS

While the novel features of the bushing and fin cooler assembly in accordance with the present invention are set forth with particularity in the appended claims, a full and complete understanding of the invention may be had by referring to the detailed description of a preferred embodiment as set forth hereinafter and as may be seen in the accompanying drawings in which:

DESCRIPTION OF A PREFERRED EMBODIMENT

Figure 1:
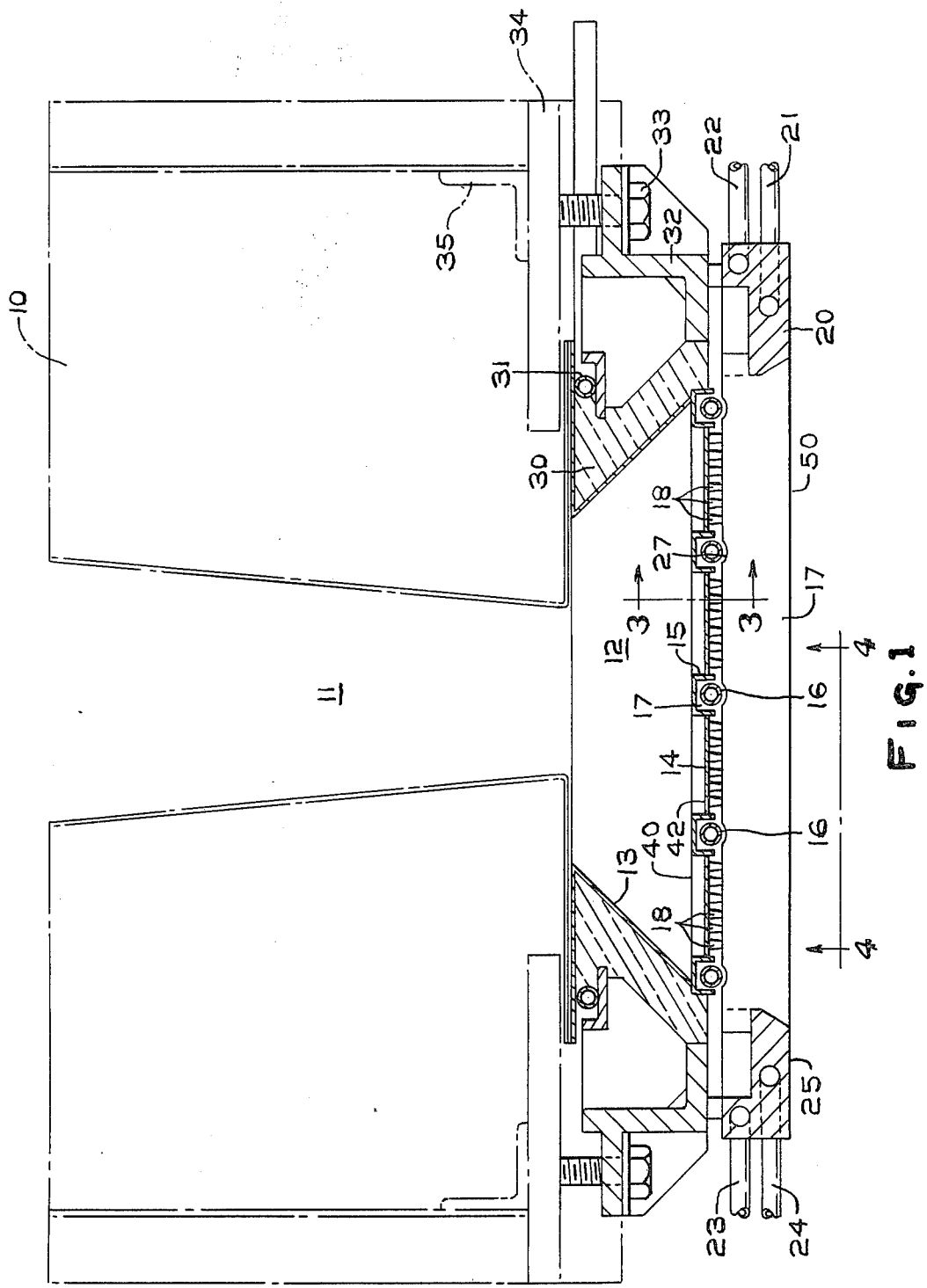
FIG. 1 is a side elevation view, partly in section, of a bushing and fin cooler assembly in accordance with the present invention.

Turning initially to FIG. 1, there may be seen a high pressure glass fiber forming assembly generally at 10 which utilizes a high pressure bushing and fin cooler assembly in accordance with the present invention. It will be understood that molten glass is supplied with forehearth 11 to the interior of bushing 12 under pressure. This pressure may be created by the use of high pressure pumps or other similar means as are known in the art. While no particular pressure creating means is specifically shown in FIG. 1, it will be understood that the molten glass is to be supplied under pressure which may be in the range of 5-25 psig and is about 10 psig in the preferred embodiment. It will also be understood that while the bushing and fin cooler assembly in accordance with the present invention is primarily intended to operate under pressure, it could also be used in a gravity system in which the glass is caused to flow to the bushing solely by gravity.

Turning again to FIG. 1, a high pressure bushing, is shown as 12, and is generally conventional in shape and is comprised of upwardly sloping walls 13 and a generally planar tip plate 14 through which molten glass flows through a plurality of glass fiber producing tips or nozzles 18. The glass filaments formed by the tips 18 are gathered, sized and collected, usually by a winder, in a conventional manner. The walls 13 of the bushing 12 are surrounded by a castable refractory 30 which carries a suitable conduit 31 for coolant flow. A frame 32 surrounds bushing 12 and refractory 30 and bolts 33 are used to secure the frame 32 and hence the bushing 12 to a structural member 34 of the forehearth. It will also be understood that suitable electrical connections (not shown) are provided to heat bushing 12 and suitable control means are also provided to control the temperature of tip plate 14.

Figure 3:
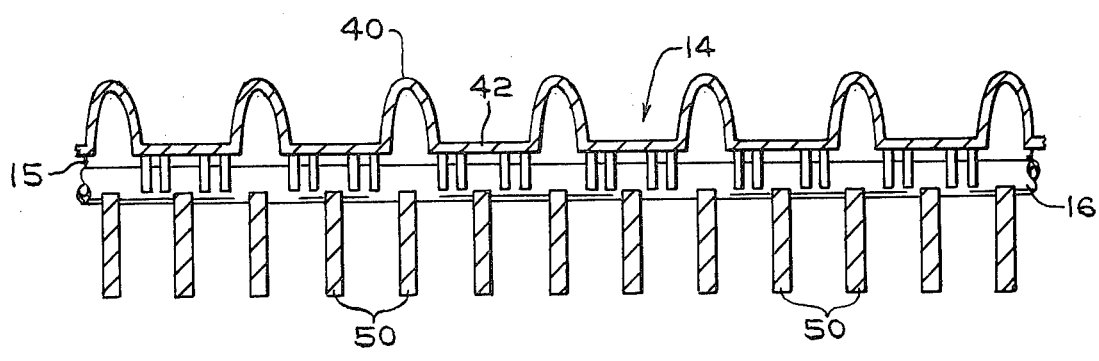
FIG. 3 is a cross-sectional view of a portion of the tip plate and fin cooler in accordance with the present invention taken along line 3—3 of FIG. 1.
Figure 4:
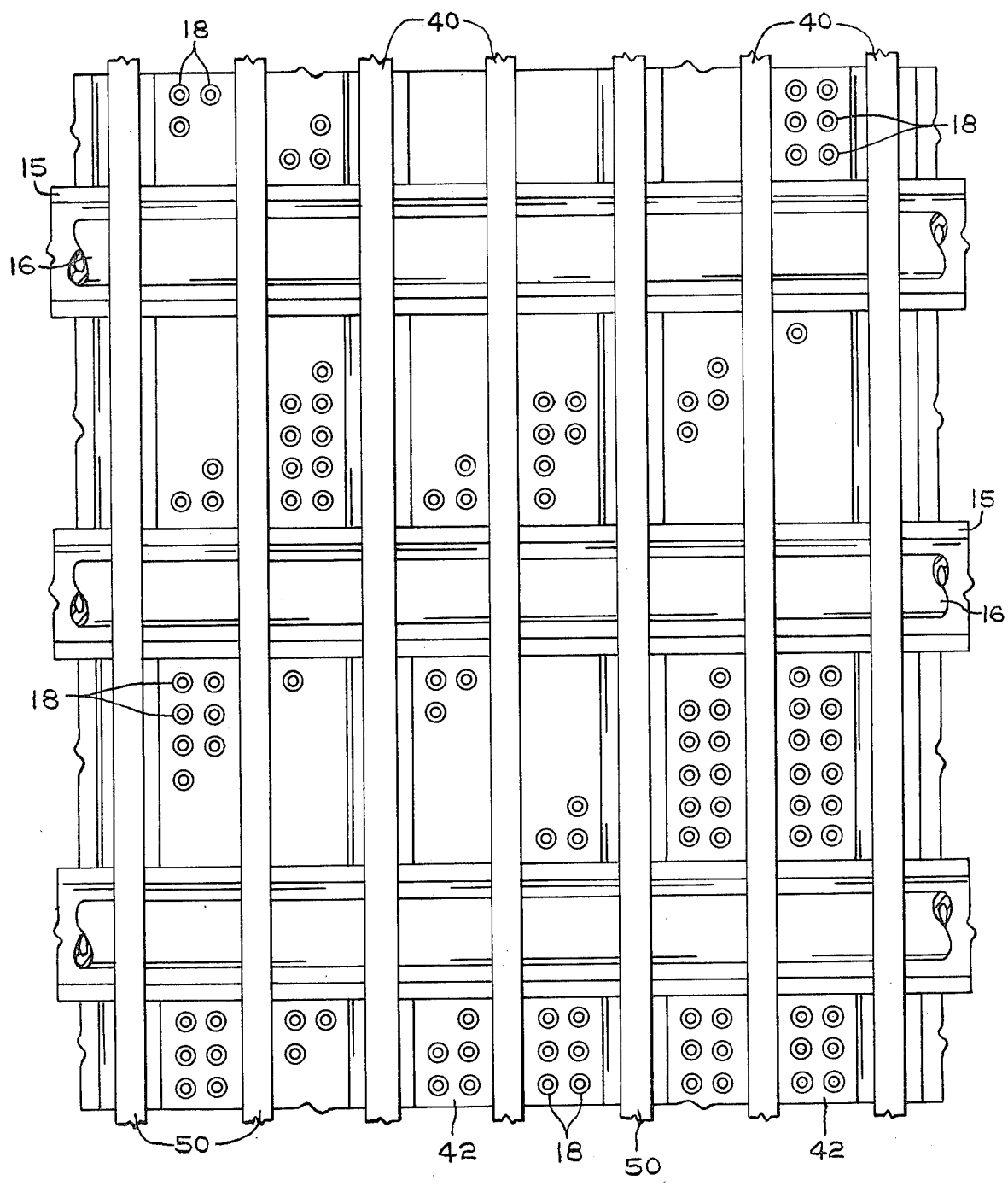
FIG. 4 is a bottom plan view of a portion of the tip plate and fin cooler taken along line 4—4 of FIG. 1.

As may be seen in FIGS. 1, 3 and 4, tip plate 14 is generally corrugated and has valleys 40 and flattened crests 42, the flattened crests carrying the glass filament forming tips 18. The use of a tip plate having valleys and flattened crests is set forth in my co-pending patent application Ser. No. 193,206, filed Oct. 2, 1980. Extending transversely to these valleys 40 and flattened crests 42 are a plurality of spaced recesses 15. As may be seen most clearly in FIG. 4, these recesses 15 cooperate with the valleys 40 to subdivide tip plate 14 into a plurality of modules, each of which carries a plurality of the nozzles or tips 18. The recesses cooperate with the corrugations of tip plate 14 to increase its strength by creating an egg carton-like structure. The recesses 15 also cooperate with the fin cooler portion of the assembly to provide support for the tip plate of the bushing, as will be discussed hereinafter.

Figure 2:
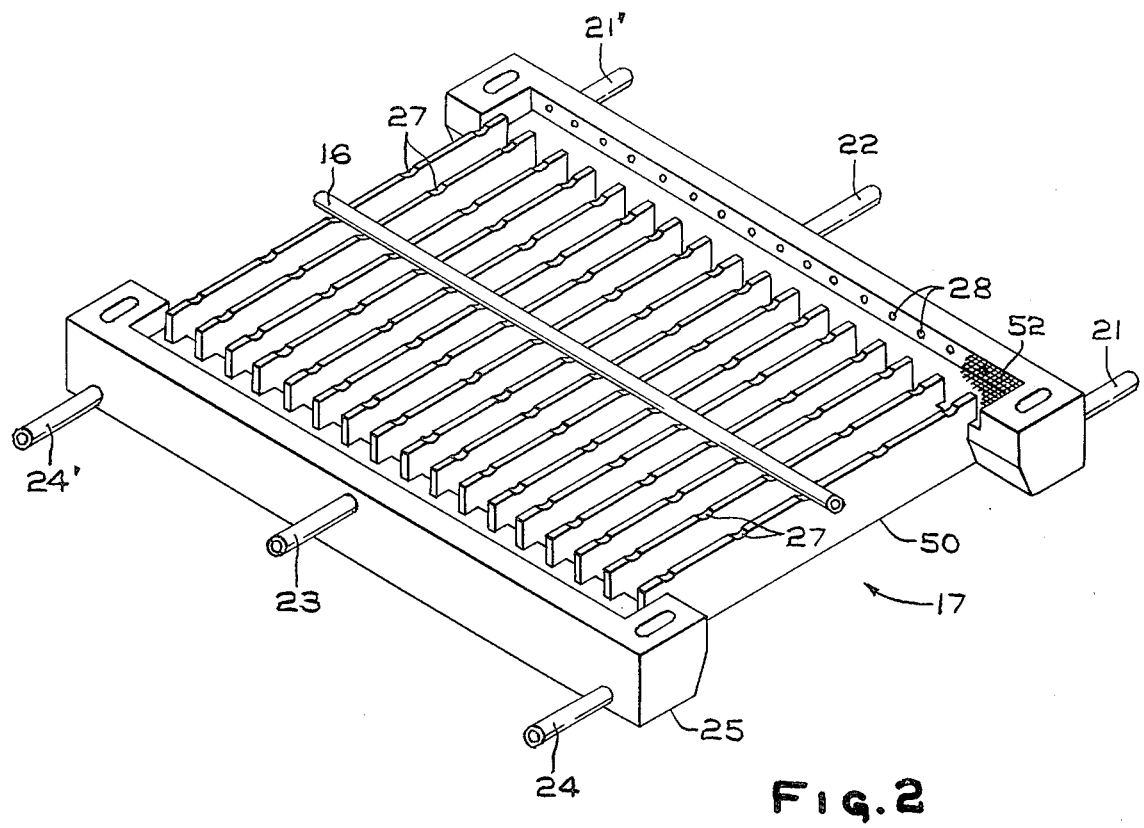
FIG. 2 is a top perspective view of the fin cooler of the present invention.

Turning now to FIGS. 1 and 2, there may be seen a fin cooler generally at 17. As may be seen most clearly in FIG. 2, fin cooler 17 is comprised of a pair of spaced manifolds 20 and 25 between which extend a plurality of fin plates 50. Each such fin plate 50 is a generally flat metal member which is secured at either end to manifolds 20 and 25. Fin cooler 17 is secured to the lower portion of bushing 12 by any conventional means and the fins 50 are positioned between rows of nozzles 18, as may be seen most clearly in FIGS. 3 and 4.

Each manifold 20 and 25 is provided with inlet and outlet coolant liquid flow lines 21, 21' and 24, 24', respectively. A central coolant liquid conduit (not shown) connects these flow lines so that coolant liquid can be circulated in the manifolds to remove heat from the fins. Each manifold 20 and 25 is also provided with a coolant gas inlet line 22 and 23, respectively. An elongated coolant gas chamber (not shown) is provided in each manifold and is in communication with a plurality of coolant gas outlet orifices 28 which direct coolant gas flow between the fins 50. A gas dispersant screen 52, typically fashioned of wire or mesh is provided, as shown in FIG. 2, between the outlets 28 and the fins 50 to provide a non-turbulent flow of coolant gas to the fins 50 and tip plate 14 of the bushing 12.

As may be seen most clearly in FIG. 2, each fin 50 is provided with several cut-outs or indentations 27 along its length. These cut-outs or saddles 27 carry, as may be seen in FIG. 2, elongated rods 16 which may either be hollow or solid and which, in the preferred embodiment, are hollow and are formed of a ceramic material. The rods are carried on the upper portions of the fins 50. When the fin cooler is joined to the bushing, each rod 16 is positioned in a corresponding recess 15 in the tip plate and the space 17 between the rod 16 and recess 15 is filled with a castable refractory material. Thus the fin cooler provides positive support for the tip plate while remaining electrically insulated therefrom. Should it be necessary to remove the fin cooler 17, the rods 16 will either be retained in the castable refractory in recesses 15 or will be removed with the fin cooler. Since, in the preferred embodiment, the rods 16 are hollow, additional coolant in the form of either liquid or gas can be directed through the rods to aid in cooling of the fins and the tip plate, if desired.

In operation, molten glass at a temperature in the range of 2200° F. and a pressure of about 10 psig is supplied to the tip plate by suitable means. Since the tip plate at this temperature is somewhat plastic, it has very little strength. In the preferred embodiment, the tip plate is about 20 inches long by 7 inches wide and the total downward pressure of 1400 pounds created by the glass under pressure would cause the tip plate to blow out in a short period of time. By subdividing the tip plate through the use of the corrugations and recesses and by using the fin cooler to hold the ceramic rods 16 against the tip plate, the deformation of the tip plate is essentially eliminated. Accordingly, finer sized nozzles or tips 18 can be used to form finer filaments with much more uniform diameters and with less winder tension than has been possible previously. This is possible because the molten glass is delivered to the tip plate under pressure and the tip plate can accomodate the pressure due to its shape and the support provided by the fin cooler in accordance with the present invention.

Thus it will be seen that a high pressure forming bushing and fin cooler assembly in accordance with the present invention has been hereinabove fully and completely described. It will be obvious to one of ordinary skill in the art, however, that a number of changes in, for example, the size of the tip plate, the size of the nozzles, the type of coolant used, the shape of the fin cooler and bushing and the like could be made without departing from the true spirit and scope of the invention and that the invention is to be limited only by the following claims.

I claim:

1. A high pressure glass forming bushing and fin cooler assembly for forming glass filaments under elevated pressure, said assembly comprising a bushing for receiving molten glass, said bushing including a tip plate having nozzles through which said glass is forced to form the filaments; corrugations on said tip plate which include valleys and crests, said filament forming nozzles carried on said crests, recesses in said tip plate transverse to said corrugations, said recesses being filled with insulation, ceramic rods carried on a fin cooler having a plurality of spaced cooling fins thereon, said fin cooler being secured beneath said bushing and the ceramic rods contacted by said tip plate at the recesses when said fin cooler is secured beneath said bushing to thereby supply support to the said bushing.

2. A bushing for high pressure glass fiber forming apparatus, said bushing comprising spaced sloping sidewalls, said sidewalls being carried by a frame secured by said apparatus, a tip plate extending generally horizontally between said sidewalls, said tip plate carrying a plurality of nozzles through which said glass is forced to form filaments, cooperating corrugations and recesses formed on said tip plate, said corrugations on tip plate including valleys and crests with the plurality of nozzles being carried on said crests and the recesses on said tip plate being transverse to said corrugations, said corrugations and recesses thereby increasing the strength of said tip plate.

3. A fin cooler for use in a high pressure glass filament forming apparatus wherein said glass filaments are formed by passage of molten glass through nozzles carried by tip plate of a bushing, said fin cooler comprising first and second spaced manifolds, each of said manifolds having a coolant liquid flow conduit and a coolant gas flow chamber therein, a plurality of spaced fin plates extending between said manifolds and secured thereto for heat transfer therewith, a means on the upper surface of said fin cooler to carry ceramic rods for contact with the tip plate when the fin cooler is secured to said bushing, and means on the tip plate of the bushing to receive the ceramic rods carried by the fin coolers.

4. The bushing of claim 1 wherein said corrugations and said recesses cooperate to divide said tip plate into a plurality of filament forming nozzle modules.

5. The fin cooler of claim 1 wherein said spaced cooling fins extend between first and second spaced manifolds.

6. The fin cooler of claim 5 wherein each of said manifolds includes a coolant liquid conduit and a coolant gas chamber, said gas chamber including orifices for delivery of said coolant gas to areas between spaced ones of said fins.

7. The fin cooler of claim 1 wherein each of said fins has a plurality of spaced cut-outs in its upper surface.

8. The fin cooler of claim 9 wherein said ceramic rods are carried on said fins in said cut-outs.

9. The fin cooler of claim 1 wherein said ceramic rods carried by said fin cooler are received in said tip plate when said fin cooler is secured to said bushing.

10. The bushing of claim 1 wherein said recesses are filled with a castable refractory, said ceramic rods being in contact with said castable refractory when said fin cooler is secured to said bushing.

11. The bushing of claim 2 wherein said corrugations include valleys and flattened crests, said nozzles being carried on said flattened crests.

12. The bushing of claim 2 wherein said recesses extend across said tip plate transversely to said corrugations.

13. The fin cooler of claim 3 wherein said coolant gas flow chamber includes a plurality of gas outflow orifices spaced adjacent said fins.

14. The fin cooler of claim 3 wherein each of said fins includes spaced cut-outs, each of said ceramic rods extending transverse to said fins and positioned in said cut-outs.

15. The fin cooler of claim 3 wherein each of said ceramic rods is hollow whereby coolant means may be flowed through said ceramic rods.

16. The fin cooler of claim 15 wherein said coolant means is a liquid.

17. The fin cooler of claim 15 wherein said coolant means is a gas.

* * * * *